Patented Aug. 11, 1936

2,050,574

UNITED STATES PATENT OFFICE 2,050,574

COMPOUNDS OF AN N-HYDROXYPROPYL ARSANILIC ACID

Wilhelm Kolle, Julius Hallensleben, Karl Streitwolf, and Hugo Bauer, Frankfort-on-the-Main, Germany, assignors to Winthrop Chemical Company, Inc., New York, N. Y., a corporation of New York No Drawing. Application November 21, 1929, Serial No. 408,927. In Germany December 28, 1922

4 Claims. (Cl. 260—14)

The present invention relates to water soluble compounds of an n-hydroxypropyl arsanilic acid.

We have found that water-soluble benzene-arsenic acids of excellent properties are obtainable by causing ethylene-oxide, epihydrin alcohol

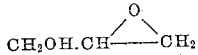

or homologues or derivatives thereof to act upon benzene-arsenic acids and their salts respectively, containing one or several amino groups.

When starting from the alkali salts of the arsonic acids, also the corresponding alkali salts are obtained as reaction products. The free acids can be prepared from them in the usual manner. Thus compounds which are easily soluble in water are obtained which contain as substituent the radical of the ethyleneoxide or its homologues. These compounds have the advantage of being readily soluble and of being well tolerated and are distinguished by their efficacy in the treatment of diseases caused by trypanosomes, recurrent spirochætæ and bacteria producing syphilis.

The products thus obtainable correspond to the following general formula

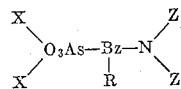

wherein X stands for hydrogen or an alkali metal, and Bz stands for a benzene ring which may be substituted, and each Z stands for the grouping —CH$_2$.CHOH.CH$_2$.Y, wherein Y stands for hydrogen, hydroxy, alkyl or alkoxy, or one Z stands for hydrogen and the other Z has the above signification, and R stands for hydrogen or the grouping

wherein the Z's are defined as above.

The following examples serve to illustrate our invention, but they are not intended to limit it thereto.

(1). 27.6 grams of the sodium salt of 3-amino-4-hydroxy-benzene-arsonic acid are dissolved in 30 cc. of water and to this solution are added 50 grams of methyl alcohol and 8 grams of epihydrin alcohol; the reaction, which may be accelerated by heating to 65° C., is complete as soon as a test portion acidified by means of acetic acid no longer precipitates the difficultly soluble 3-amino-4-hydroxybenzene-arsonic acid. The separated preparation has the formula:

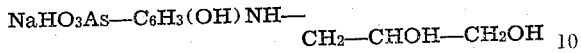

(2). 21.7 grams of para-aminobenzene-arsonic acid are dissolved in 50 cc. of 2N-caustic soda solution and 15 grams of ethylene oxide are added thereto while cooling. The mixture is shaken for 12 hours and the reaction product is separated by means of alcohol. It has the formula:

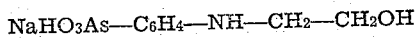

(3). 23.3 grams of 3-amino-4-hydroxybenzene-arsonic acid are dissolved in 50 cc. of 2N-caustic soda solution, 39 cc. of epichlorhydrine are added thereto and the whole is shaken until a test portion is no longer diazotizable. The solution is diluted with 1200 cc. of methyl alcohol filtered and the preparation is separated by means of 12.8 liters of ether. It has the formula:

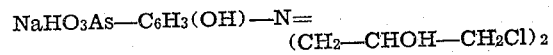

(4). 23.3 grams of 2-hydroxy-4-aminobenzene-arsonic acid are caused to react with epichlorhydrine in the same manner as indicated in Example 3.

(5). 23.3 grams of 3-amino-4-hydroxybenzene-arsonic acid are dissolved in 50 cc. of 2N-caustic soda solution and the whole is treated with ethylene oxide as indicated in Example 2. The preparation thus obtained has the formula:

(6). 21.7 grams of para-aminobenzene-arsonic acid are dissolved in 50 cc. of 2N-caustic soda solution and, after addition of 33 grams of epihydrin alcohol, the whole is shaken until there is no longer any diazotizable substance. From the filtrate which is diluted with methyl alcohol the solid preparation of the formula:

is separated by means of ether.

(7). 21 grams of para-aminobenzene-arsonic acid are stirred for 12 hours at 50° C.—60° C. with 10 cc. of epihydrin alcohol in 40 cc. of methyl alcohol. The alcohol is distilled off and the residue is dissolved in a small quantity of water. From the neutralized solution the solid substance is precipitated by means of alcohol and ether. It has the formula:

$$H_2O_3As—C_6H_4—NH—CH_2—CHOH—CH_2OH$$

(8) 23.3 grams of 3-hydroxy-4-aminobenzene-arsonic acid are dissolved in 50 cc. of 2N-caustic soda solution and after addition of 33 grams of epihydrin alcohol the whole is shaken for 6 hours. The mass is then diluted with 968 cc. of methyl alcohol and filtered. By introducing, while stirring, the filtrate into 10.5 liters of ether, the solid preparation is separated which has the formula:

$$NaHO_3As—C_6H_3(OH)—N=\\(CH_2—CHOH—CH_2OH)_2$$

(9) By causing 23.3 grams of 3-amino-4-hydroxybenzene-arsonic acid to react with epihydrin alcohol, in the manner indicated in Example 8, the isomeric compound is obtained.

(10) In the same manner as indicated in Example 8, 23.3 grams of 2-hydroxy-4-aminobenzene-arsonic acid can be caused to react with epihydrin alcohol.

In an analogous manner can also be obtained the di-sodium salts and the corresponding salts of the other alkalies.

The free acids can be prepared from the salts according to one of the usual methods.

The benzene nuclei may generally be substituted by any substituents such as alkyl, halogen, hydroxyl, the nitro group or the like.

Instead of the ethylene oxide there can also be used the homologues thereof such as propylene oxide.

This application contains subject matter in common with our co-pending application Ser. No. 683,074, filed December 27, 1923, matured into Patent No. 1,815,979, dated July 28, 1931, and is to be regarded as a continuation-in-part of said application.

We claim:
1. The compound of the following formula:

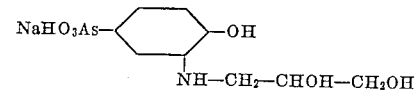

being easily soluble in water.

2. The compound of the following formula:

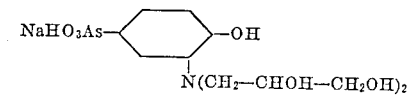

being soluble in water.

3. Compounds of the following general formula:

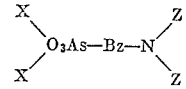

wherein X stands for hydrogen or an alkali metal, and Bz stands for a benzene ring which may be substituted by a hydroxyl group, and each Z stands for the grouping —CH_2—CHOH—CH_2—y, wherein y stands for hydrogen, hydroxy, alkyl or alkoxy, or one Z stands for hydrogen and the other Z has the above signification.

4. Compounds of the following general formula

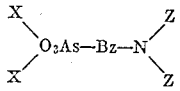

wherein X stands for hydrogen or an alkali metal, and Bz stands for a benzene ring which may be substituted by a hydroxyl group, and each Z stands for the grouping —CH_2—CHOH—CH_2OH, or one Z stands for hydrogen and the other Z has the above signification.

WILHELM KOLLE.
JULIUS HALLENSLEBEN.
KARL STREITWOLF.
HUGO BAUER.